United States Patent [19]

Hilbert

[11] Patent Number: 4,722,421
[45] Date of Patent: Feb. 2, 1988

[54] STRAP FOR STABILIZING PLATFORM TO UPRIGHT MEMBER

[75] Inventor: Thomas F. Hilbert, Fond du Lac, Wis.

[73] Assignee: Total Shooting Systems, Inc., Fond Du Lac, Wis.

[21] Appl. No.: 1,571

[22] Filed: Jan. 8, 1987

[51] Int. Cl.$^4$ ................... A01M 31/02; A45F 3/26
[52] U.S. Cl. ................................. 182/187; 182/134
[58] Field of Search ................. 182/187, 188, 134; 108/152

[56] References Cited

U.S. PATENT DOCUMENTS

| | | | |
|---|---|---|---|
| 3,854,551 | 12/1974 | Lindow | 182/187 |
| 4,427,092 | 1/1984 | Tentler | 182/134 |
| 4,428,459 | 1/1984 | Peck | 182/134 |
| 4,597,473 | 7/1986 | Peck | 182/187 |

*Primary Examiner*—Reinaldo P. Machado
*Attorney, Agent, or Firm*—John C. Cooper, III; Fred Wiviott

[57] ABSTRACT

A support platform includes a notch for engaging an upright member, such as a tree or utility pole, and further includes a flexible steel band that encircles the upright member and supports the platform. The band is positioned at an angle extending upwardly and rearwardly from the platform and further supported at either side of the platform with adjustment means to lengthen or shorten the band to accommodate the periphery of the upright member. There is further provided a flexible strap contacting the steel band and which is of sufficient length to be wrapped around the upright member and to serve as a stabilizer for the platform, and which in its preferred embodiment is in the form of an elongated webbing having a buckle member at one of its free ends to releaseably and adjustably engage the other free end after the strap has been wrapped around the upright member and wherein the strap is threaded through an elastomeric sleeve arranged to receive the metal band and thereby retain the webbing or strap against the band when both the band and the strap have been secured in place relative to the upright member.

8 Claims, 6 Drawing Figures

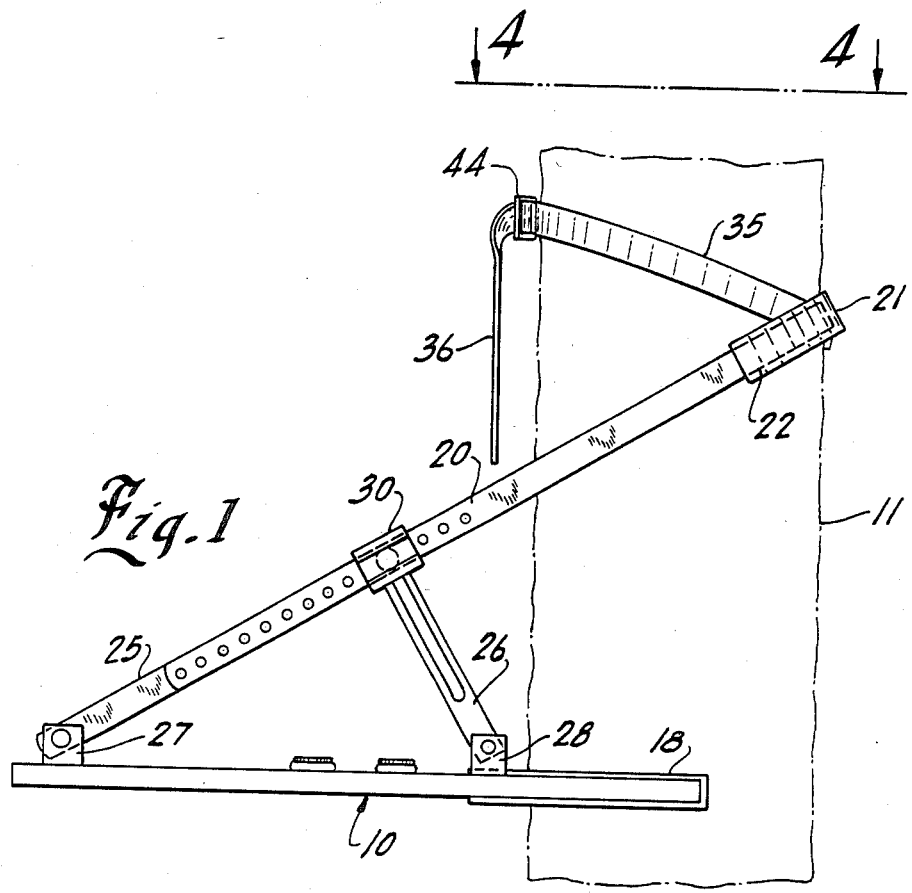
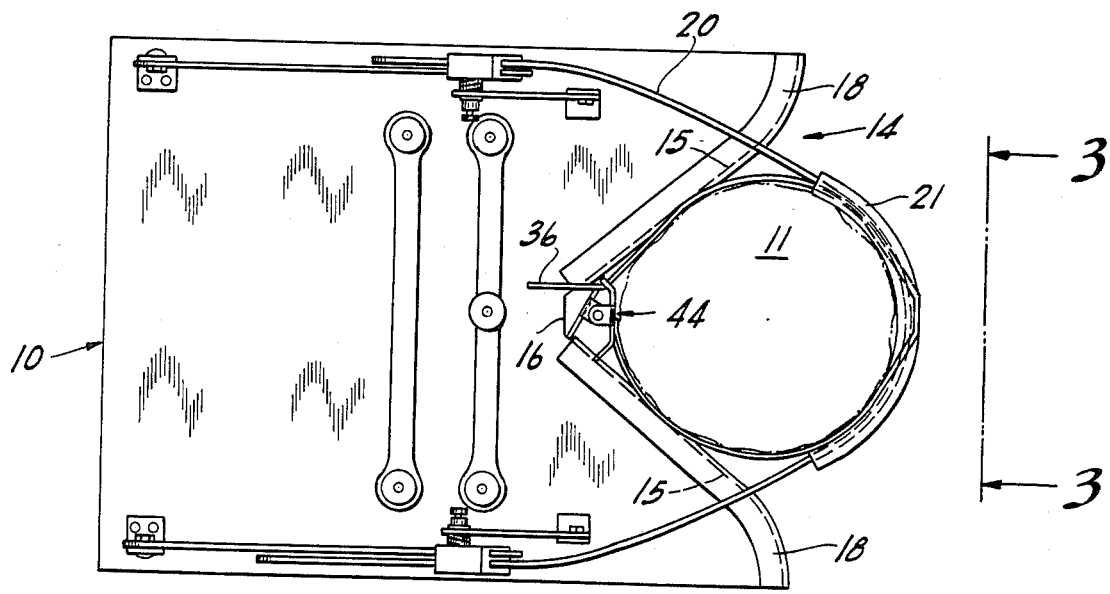

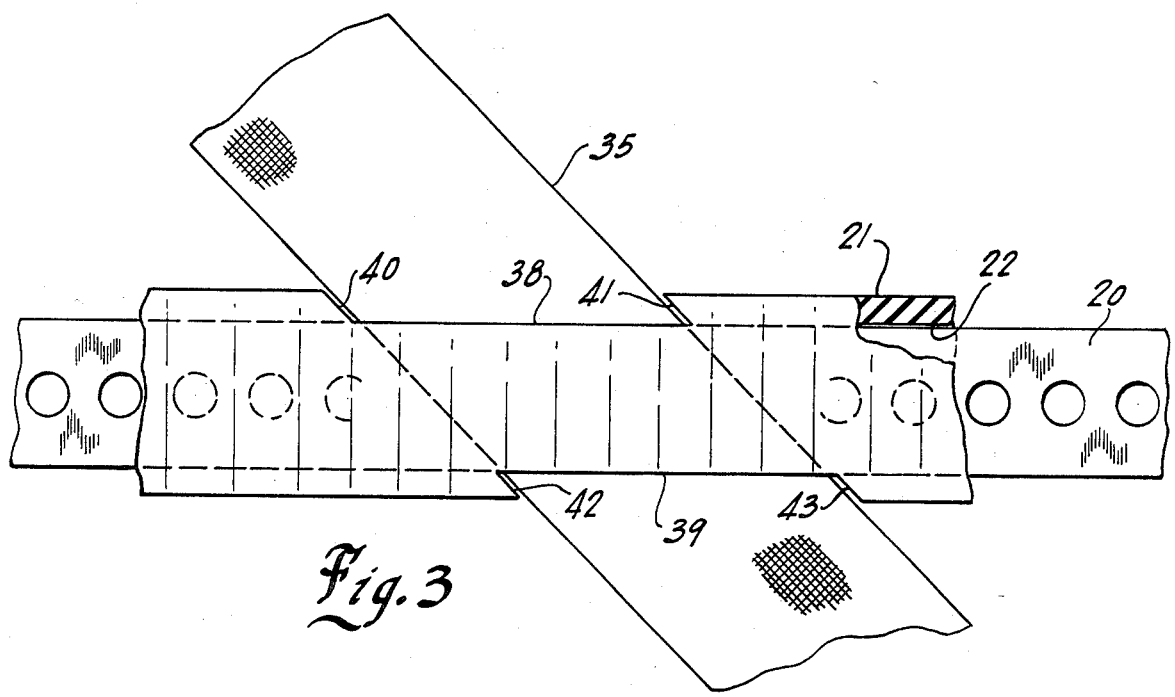
Fig. 3
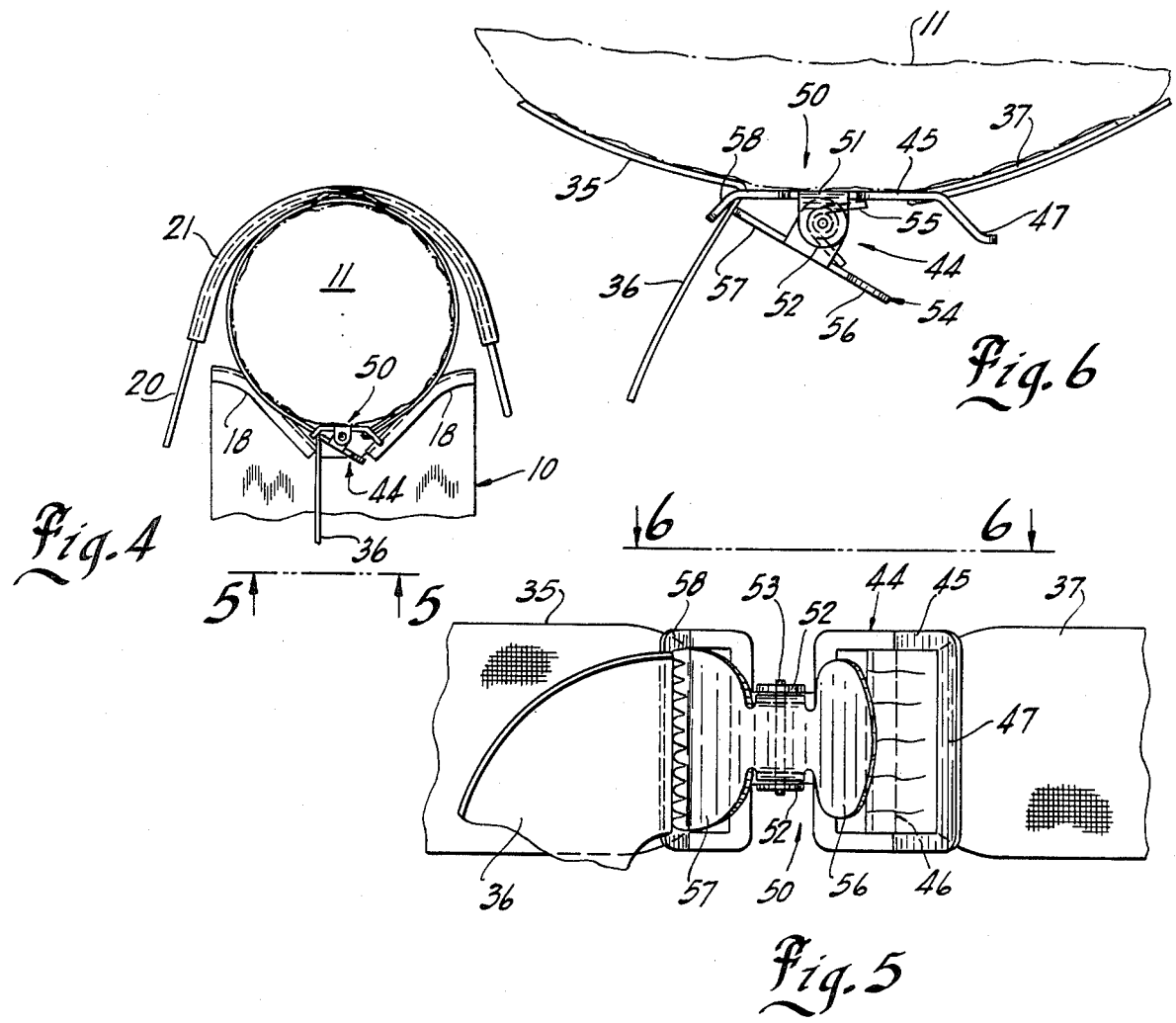
Fig. 4
Fig. 6
Fig. 5

STRAP FOR STABILIZING PLATFORM TO UPRIGHT MEMBER

BACKGROUND OF THE INVENTION

The invention relates to a platform which may be in the form of a conventionally known tree stand used by hunters, photographers and naturalists to obtain a high viewing position. Typically, the platform is supported on an upright member such as a tree or a utility pole and defines a notch at the rear of the platform to engage the upright member. There is also provided a supporting metal band which encircles the upright member and supports the platform. There is further provided at each side of the platform means for engaging the metal band and to adjust the band to accommodate the periphery of the upright member with the band being positioned at an angle extending upwardly and rearwardly from the platform. Previous platforms of the type described and claimed herein have been disclosed in U.S. Pat. Nos. 4,427,092 issued to Lynn A. Tentler, and 4,428,459 and 4,597,473 each respectively issued to Paul L. Peck.

The preferred embodiment of the present invention utilizes the construction of U.S. Pat. No. 4,597,473 and provides additional stabilization to the platform disclosed therein.

SUMMARY OF THE INVENTION

Among the objects of the present invention is the provision of a generally horizontally disposed support platform with a notch for receiving an upright member, such as a tree trunk or utility pole, and which has a support member which may be in the form of a flexible steel band encircling and engaging the upright member (provision of a stabilizing means). The band is positioned at an angle extending upwardly and rearwardly from the platform and is supported at each side of the platform by means including front and rear legs pivoted on the platform and slidably interconnected. There is also means for adjusting the band and securing it in place with respect to the front and rear leg members.

The stabilizing means is preferably in the form of an elongated adustable strap, which may be of a woven web material, and which strap is arranged to encircle the upright member and to cooperate with the supporting metal band to provide additional stability to the platform. It is another object of the present invention to provide the stabilizing means in the form of a flexible adjustable strap interconnected with the metal band and transversely thereof and compressively engaging the metal band against the upright member.

BRIEF DESCRIPTION OF THE DRAWINGS

FIG. 1 is a side elevation of the platform erected for use on an upright member such as a tree or utility pole shown in dashed lines FIG. 2 is a plan view of the stand.

FIG. 3 is a section taken along lines 3—3 on FIG. 2.

FIG. 4 is a section taken along lines 4—4 of FIG. 1.

FIG. 5 is a detailed plan view of the strap locking mechanism taken along lines 5—5 of FIG. 4.

FIG. 6 is a detailed elevation of the strap locking mechanism of the present invention, taken along lines 6—6 of FIG. 5.

DETAILED DESCRIPTION OF THE DRAWINGS

FIGS. 1 and 2 show a supporting platform 10 disposed in a substantially horizontal plane relative to an upright member 11, which member 11 may be in the form of a tree or a utility pole. Platform 10 is preferably provided with a notch 14 in a V configuration defining diverging sides 15 intersecting at an apex 16. The notch 14 is preferably provided with a rubber extrusion 18 covering the edge of the notch and the adjacent top and bottom edge of the notch to permit the notch 14 to grip the upright member 11 and to minimize damage to the surface of the upright member, and in particular, the bark of a tree. The platform 10, as previously mentioned, is intended for supporting hunters, photographers and naturalists to obtain a high viewing position.

The platform has a supporting band 20 preferably of perforated steel ribbon to grasp the trunk of a tree or other upright member 11 on the other side of the notch 14. The band 20, as shown in FIGS. 1 and 2 encircles the upright member 20 to force-couple, driving the platform notch 14 against the upright member 11 and thereby retain the platform 10 thereon. The part of the band 20 engaging the upright member 11 is provided with an extruded rubber sleeve 21 to avoid damage to the upright member 11 It is to be noted that the extruded rubber sleeve 21 is provided with a continunous elongated chamber 22 for receiving the metal band 20. Although an extrusion is preferred, it is within the province of the present invention to provide a rubber or other elastomeric sleeve which may be molded and define an elongated, coextensive slit (not shown) open at the bottom with resepct to FIG. 1 to receive the metal band 20. The band 20, although preferably of a perforated, flexible sheet steel material, may be in the form of a rigid bar either integral with or joined to side bars fastened to the platform, or of a metal chain, belting, rope or other well-known configuration.

As described in the aforementioned U.S. Pat. No. 4,597,473, the adjustable support means are provided on each side of the platform 10. Each support means includes a front leg 25 and a rear leg 26. Both legs 25, 26 are preferably made of flexible steel so that the upper end of each leg can flex inwardly or outwardly to adapt to the size of the upright support or other conditions. The lower end of each leg is pivotally connected to the platform 10 by means of simple L-shaped brackets 27, 28, respectively. These brackets 27 and 28 are through bolted to the platform 10 and provide a pivotal connection so that the associated leg may pivot above a horizontal axis to permit the legs to fold down against the platform for transportation and storage.

The free ends of the legs are slidably connected. The free end or outer end of the front leg 25 is provided with a guide bracket 30. The guide bracket 30 is an extruded member cut to length and has a channel-like configuration (not shown). The end of leg 22 is received in the cooperating grooves formed in the legs of the channel (not shown herein but disclosed in detail in the Peck U.S. Pat. No. 4,597,473).

Adjustment of the metal band 20 and the respective legs 25 and 26 is made by means of the bracket 30 and components thereof. Again, detailed description and operation of the bracket may be found in the aforementioned Peck patent. The arrangement permits the legs 27, 28 to be collapsed to provide minimal size for ease in transportation before and after positioning on the upright member 11.

There are also means provided for locking the band relative to the legs, which means are also fully disclosed in the Peck patent and do not form a part of the present invention.

The present invention provides additional stabilizing means in the form of the elongated flexible strap 35, which in its preferred embodiment takes the form of a belt-like webbing material. The present invention also anticipates the use of other strap-like members, such as metallic chains, leather belting, rope, wire and elongated plastic strapping members. It is preferred to retain the flexible strap 35 immediately adjacent and relative to the band 20. As viewed in FIG. 3, the webbing or strap 35 is threaded through the chamber 22 of the elastomeric sleeve 21 at the rearward side of the band 20 with respect to the platform 10 and upright member 11. The elastomeric sleeve 21 is formed to provide notches 38 and 39 on opposite sides of the sleeve 21. It is also preferred, for ease of installation, to provide angularly disposed end surfaces 40, 41 on notch 38 and ends 42, 43 on notch 39. The oppositely disposed, respective ends 40, 42 and 41, 43 may be cut or otherwise provided at approximate 45 degree angles relative to the sides of the elastomeric sleeve 21.

The free ends 36, 37 of the flexible strap 35 as shown in FIGS. 1 and 2 are wrapped around the upright member 11 to embrace the member, preferably disposed in a plane horizontally or angularly above the point of contact of the band 20 with the upright member 11. The free ends 36, 37 define the strap 35 to be of sufficient length to encircle the upright member 11 and are joined together by means of a strap locking mechanism in the form of a buckle 44 as shown in detail in FIGS. 4, 5 and 6. The buckle 44 preferably includes an integrally formed web having a frame portion 45 with a centrally disposed web support post 46 around which, as shown in FIGS. 5-6, inclusive, there is threaded the free end 37 of the strap 35. The free end 37 is folded back upon itself and secured by sewing or other fastening means. The buckle 44 preferably has its right-hand frame element 47 bent outwardly relative to the strap 35.

A web-clamping element 50 is supported on an integral stationary bar 51 having upstanding ends 52 supporting a pivot pin 53. A spring-biased, manually-operated clamping element 54 is biased towards the bar 51 by means of a helically wound spring 55 surrounding the pivot pin 52. The clamping element 50 extends laterally to provide a finger pad 56 and an oppositely disposed, serrated, web-engaging element 57.

As shown in FIGS. 4, 5 and 6, the free ends 36, 37 of the strap 35 are preferably passed around diametrically opposite points on the upright element 11, and then brought forward with free end 36 being threaded between the serrated surface on the element 57 and the post 58 and then pulled tightly against the bias of the clamping element 50 to provide the desirable added stability of the platform 10 of the invention. The free end 36 may also be additionally threaded between the end portion 37 and the frame element 47.

I claim:

1. In a tree stand comprising:

a platform defining a notch formed at the rear of said platform adapted to receive an upright member, a supporting metal band adapted to embrace the upright member, support means on each side of said platform for adjustably engaging said band, each said support means connected to said platform to fix said band at an angle relative to said platform so that the band engages the back of the upright member above the platform, means for locking the band when said band is in its adjusted position relative to said upright member, the combination therewith of;

a stabilizing member comprising an elongated flexible strap contacting said metal band intermediate the ends of said strap, the strap being of sufficient length to be wrapped around said upright member, an adjustable locking mechanism for maintaining the free ends of said strap fastened together when in wrapped relationship with said upright member, said strap and said locking mechanism being adjustable to accommodate the peripheral dimension of the upright member and to cooperate with said band to stabilize the platform relative to said upright member.

2. The combination set forth in claim 1, wherein the flexible strap is supported by said band.

3. The combination set forth in claim 1, wherein an elastomer is disposed on the inner, upright-engaging side of said band, and the flexible strap engages the outer side of said band.

4. The combination set forth in claim 1, wherein said band is embraced by an elastomeric sleeve defining a band-receiving chamber extending coextensive of the length of said sleeve.

5. The combination set forth in claim 4, wherein said elastomeric sleeve is notched at opposite sides and intermediate the ends thereof to receive the flexible strap extending transversely of said band.

6. The combination set forth in claim 1, wherein said strap locking mechanism comprises a buckle having two spaced apart integrally formed frame portions joined by an intermediate clamp support portion, one of said frame portions fastened to and supporting a free end of said strap, a spring-biased, manually operated clamp cooperating with the other of said frame portions to releasably engage the other free end of said strap.

7. The combination set forth in claim 1, wherein the supporting band is a flexible metal band adapted to embrace the upright member, and wherein the support means on each side of the platform includes front and rear legs pivotally connected to the platform and slidably connected to each other to permit angular adjustment and to fix the band at said angle relative to the platform.

8. A method of stabilizing a support platform having a notch engaging an upright member and a flexible, adjustable band grasping the upright member at a point above said platform notch, and comprising the steps of:

providing a flexible strap, positioning the strap adjacent to the band, wrapping the strap around the band and the upright member, and fastening the free ends of said strap to embrace the band and the upright member.

* * * * *